(12) United States Patent
Chiang

(10) Patent No.: US 7,637,540 B2
(45) Date of Patent: Dec. 29, 2009

(54) LATCH STRUCTURE

(75) Inventor: Ling-Yu Chiang, Shulin (TW)

(73) Assignee: ASUSTeK Computer Inc., Taipei (TW)

( * ) Notice: Subject to any disclaimer, the term of this patent is extended or adjusted under 35 U.S.C. 154(b) by 489 days.

(21) Appl. No.: 10/995,167

(22) Filed: Nov. 24, 2004

(65) Prior Publication Data
US 2005/0180562 A1 Aug. 18, 2005

(30) Foreign Application Priority Data
Feb. 5, 2004 (TW) .............................. 93102694 A

(51) Int. Cl.
*E05C 3/06* (2006.01)
*E05C 19/10* (2006.01)

(52) U.S. Cl. .............................. 292/45; 292/49; 292/54; 292/95; 292/98; 292/121; 292/128; 292/197; 292/DIG. 37; 361/679.57

(58) Field of Classification Search .................. 292/45, 292/49, 50, 54, 95, 96, 98, 101, 108, 121, 292/125, 128, 194, 197, 202, 210, 219, 220, 292/224, 225, 228, 300, 304, DIG. 37; 361/683
See application file for complete search history.

(56) References Cited

U.S. PATENT DOCUMENTS

| 3,596,952 | A | * | 8/1971 | Hinkle et al. ................. 292/27 |
| 4,365,490 | A | * | 12/1982 | Manzoni ......................... 70/70 |
| 4,784,414 | A | * | 11/1988 | Free .............................. 292/52 |
| 4,893,849 | A | * | 1/1990 | Schlack .......................... 292/7 |
| 6,517,129 | B1 | * | 2/2003 | Chien et al. .............. 292/251.5 |
| 6,540,268 | B2 | * | 4/2003 | Pauser .......................... 292/48 |
| 6,847,520 | B2 | * | 1/2005 | Hashimoto .................. 361/680 |
| 7,088,588 | B2 | * | 8/2006 | Lee .............................. 361/725 |
| 2005/0087993 | A1 | * | 4/2005 | Lin ............................... 292/45 |

* cited by examiner

*Primary Examiner*—Carlos Lugo
(74) *Attorney, Agent, or Firm*—Birch, Stewart, Kolasch & Birch, LLP

(57) ABSTRACT

A latch structure includes a base, a connecting unit, a first spring member, at least one hook unit and a button. In this case, the connecting unit has a first side and a second side, and the connecting unit is disposed on the base. The first spring member has a first end and a second end. The first end connects to the connecting unit and the second end connects to the base. At least one hook unit is located at the first side of the connecting unit. The hook unit has a moving member with a hook portion and a connecting portion, and the hook portion locates in a first site. The button is located at the second side of the connecting unit. When the hook portion does not locate in the first site, the button moves toward a first direction, the button pushes the connecting unit in a second direction, and the connecting unit touches the connecting portion. Accordingly, the hook portion turns to the first site.

11 Claims, 7 Drawing Sheets

LATCH STRUCTURE

BACKGROUND OF THE INVENTION

1. Field of Invention

The invention relates to a latch structure and, in particular, to a latch structure that has a hidden latch.

2. Related Art

As the electronic age coming, the demand and the dependence of the electronic products increase. In this consumer-oriented time, not only a competed price of a good product, but also the character and convenience of the product are the key reasons for consumers to purchase or not. Therefore, manufacturers seriously investigate the products according to the demand of consumers.

Hereinafter, a notebook is used as an example. Please refer to FIG. 1, the conventional notebook 1 includes a main body 11 and a cover 12, and the cover 12 is a display. A rear portion 121 of the cover 12 is connected to a rear portion 111 of the main body 11. The cover 12 has a display portion 122 and a back 123 of the cover 12. The cover 12 can be rotated and closed on the main body 11 with either the display portion 122 or the back 123 of the cover 12 facing downward.

The main body 11 comprises at least one retainer 112, at least one magnetic member 113 and at least one button 114. The magnetic member 113 is disposed under the retainer 112. The button 114 and the magnetic member 113 are disposed correspondingly.

The cover 12 comprises at least one first opening 124 on the display portion 122 and at least one opposite second opening 125 on the back 123 of the cover 12. The positions of the first opening 124, the second opening 125 and the retainer 112 are corresponding. The notebook 1 further comprises a hook structure 3, which adjacent to the first opening 124 and the second opening 125.

Please refer to FIG. 2 and FIG. 3, the hook structure 3 comprises a fixing member 31, a shaft 32, a first spring member 33 and a hook 34. The fixing member 31 is fixed on the cover 12. The hook 34 with a hook portion 341 and a connecting portion 342 pivots on the fixing member 31 through the shaft 32. The hook portion 341 comprises permeable materials. The first spring member 33 with a first end 331 and a second end 332 is disposed on the shaft 32. Due to the resilience of the first spring member 33, the first end 331 and the second end 332 abut one side of the connecting portion 342 when the hook 34 is in an original position (a first site, S1). When an external force, which is greater than the resilience of the first spring member 33 applies to the hook 34, the hook 34 may rotate between the first site S1, a second site S2 and a third site S3. An included angle of the second site S2 and the third site S3 is 180 degree. And, the hook 34 is T shaped.

When the cover 12 is closed on the main body 11 and the hook portion 341 is attracted by the magnetic member 113, so that the hook portion 341 engages the retainer 112, fixing the cover 12 and the main body 11. As shown in FIG. 4A and FIG. 4B, The button 114 further comprises a shelter portion 1141 which can cut off the magnetic force. As shown in FIG. 2, FIG. 4A and FIG. 4B, when the button 114 is forced to move in a first direction, the shelter portion 1141 is moved to a position between the magnetic member 113 and the hook portion 341, reducing the magnetic force exerted thereon. Thus, the magnetic force is less than the resilience of the first spring member 33, and the hook 34 is forced back to the first site. A second spring member 115 is disposed between the button 114 and the magnetic member 113. When the force applied to the button 114 is released, the button 114 is forced by the resilience of the second spring member 115 to move in a second direction. The second direction is opposite to the first direction. Thus, the shelter portion 1141 removes from the magnetic member 113.

In the conventional notebook 1, the hook structure 33 and the button 114 are disposed on the cover 12 and the main body 11, respectively. However, the design of the conventional notebook will increase the fabricating time, further will increase the cost and decrease the yield of the product.

It is therefore a subjective of the invention to provide a latch structure that can solve the above-mentioned problems.

SUMMARY OF THE INVENTION

In view of the above, the invention is to provide a latch structure that may decrease the cost and the fabricating time.

To achieve the above, the latch structure of the invention includes a base, a connecting unit, a first spring member, at least one hook unit and a button. In this case, the connecting unit has a first side and a second side, and the connecting unit is disposed on the base. The first spring member has a first end and a second end. The first end connects to the connecting unit and the second end connects to the base. At least one hook unit is located at the first side of the connecting unit. The hook unit has a moving member with a hook portion and a connecting portion, and the hook portion locates in a first site. The button is located at the second side of the connecting unit, wherein when the hook portion does not locate in the first site, the button moves forward to a first direction, the button pushes the connecting unit in a second direction, the connecting unit touches the connecting portion, so that the hook portion turns to the first site.

As described before, in the latch structure of the invention, the button is adjacent to the hook unit. In comparison with the prior art, the invention may shorten the fabricating time and increase the yield of the product.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Hereinafter, a notebook is used as an example.

Figure 1:
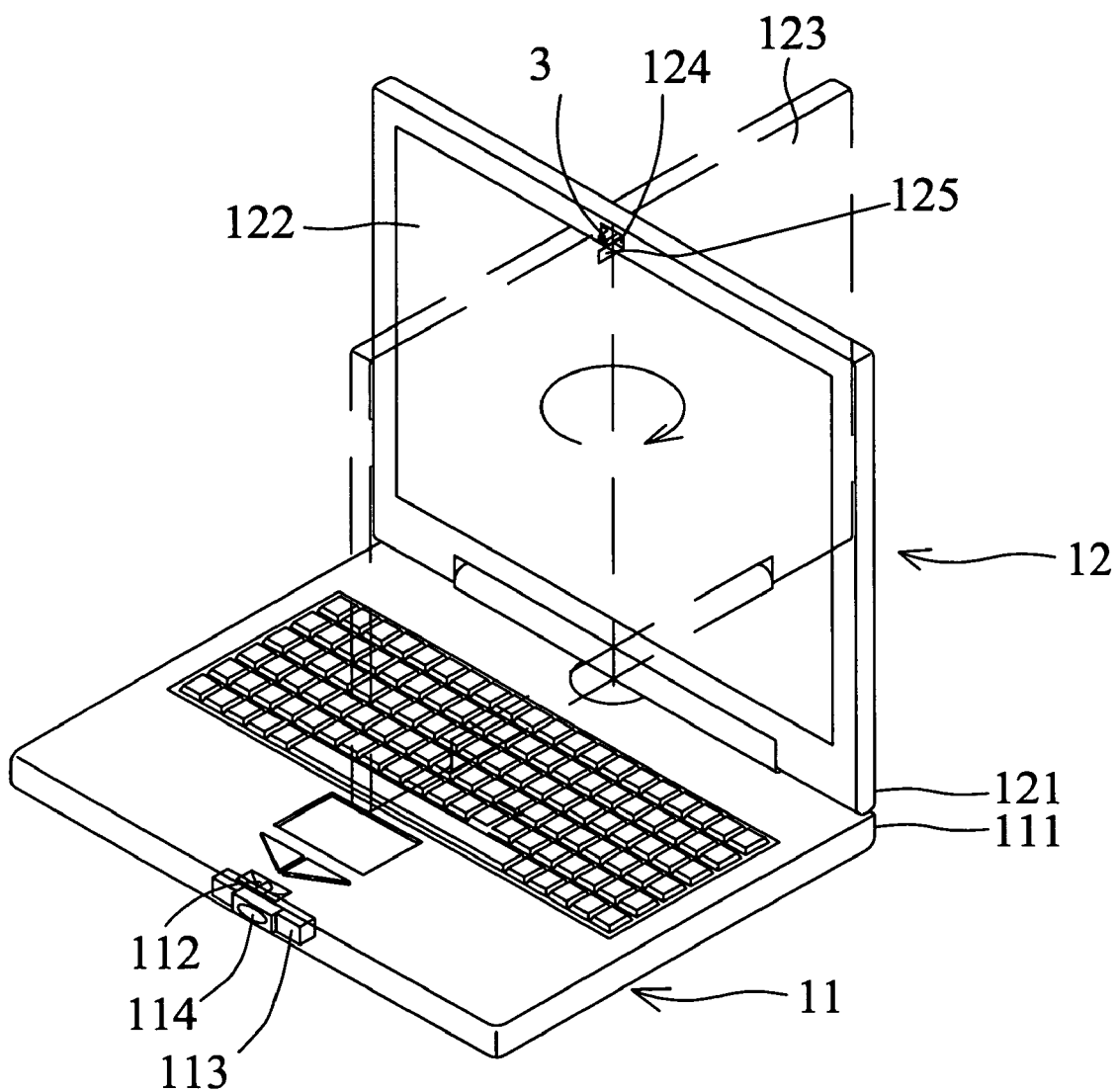
FIG. 1 is a schematic view of a conventional notebook.
Figure 2:
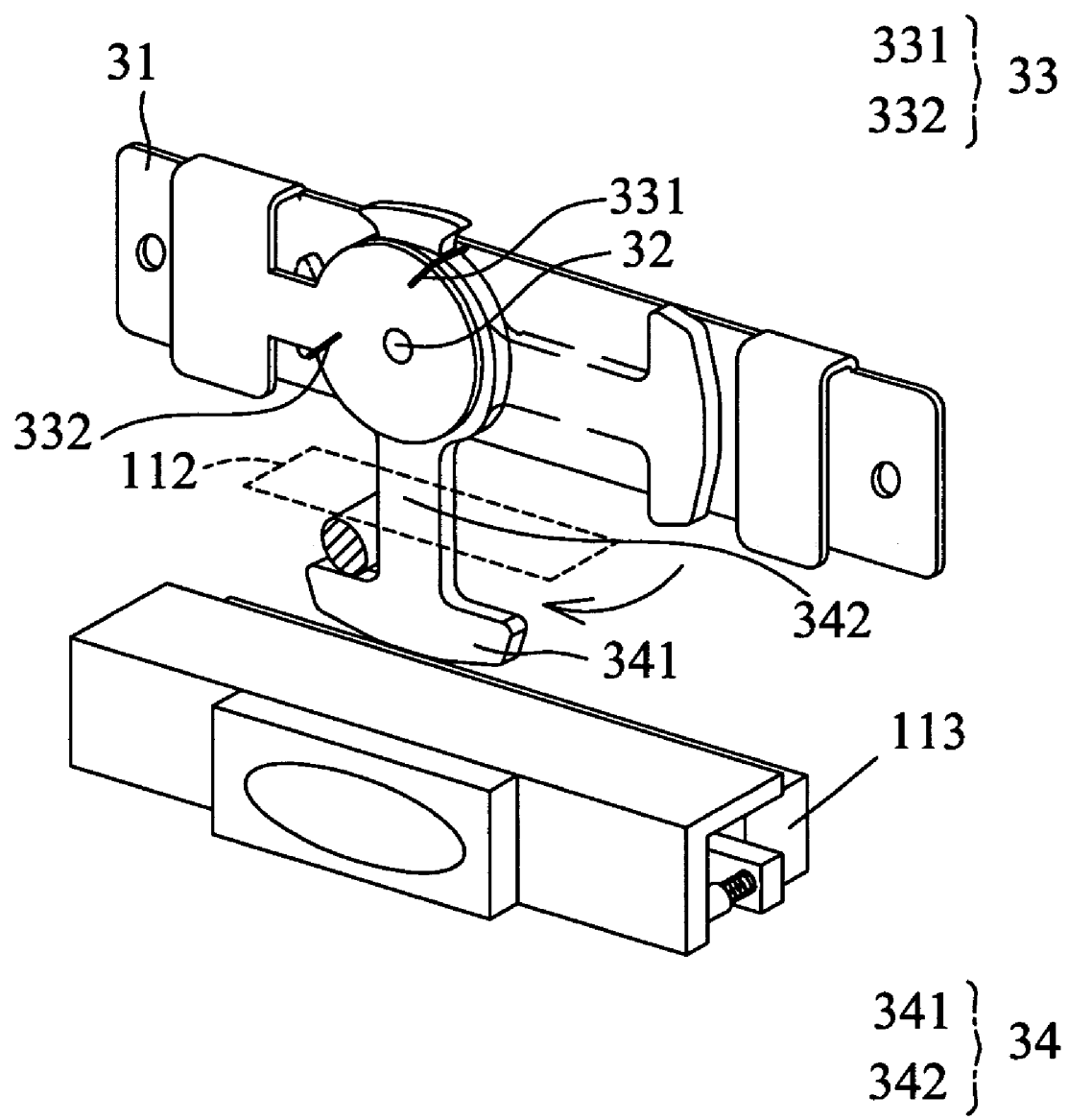
FIG. 2 is a schematic view of the conventional latch structure.
Figure 3:
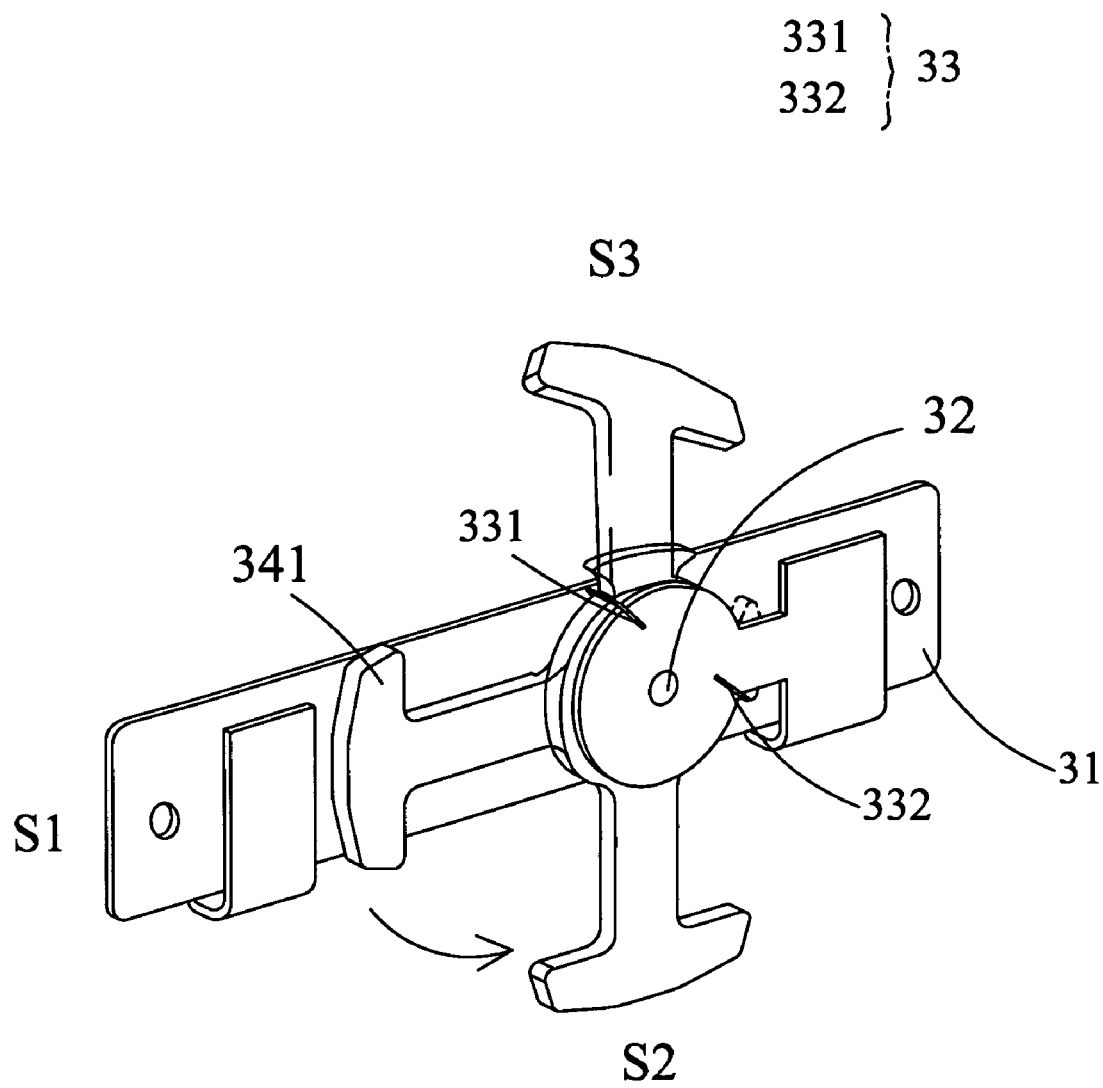
FIG. 3 is a schematic view that shows the movement of the conventional hook.
Figure 4A:
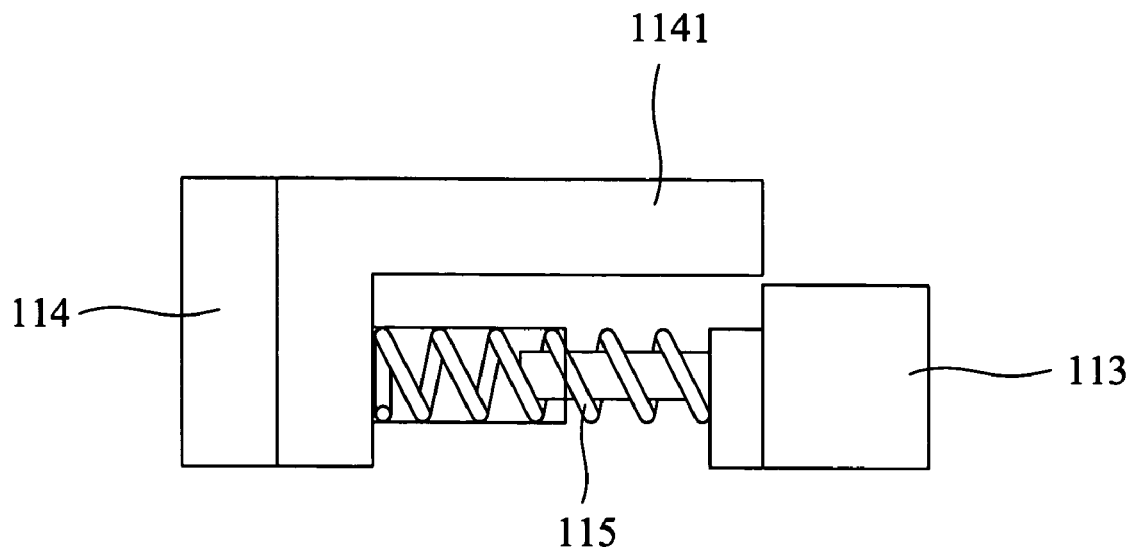
FIG. 4A is a schematic view of the conventional button in a released position.
Figure 4B:
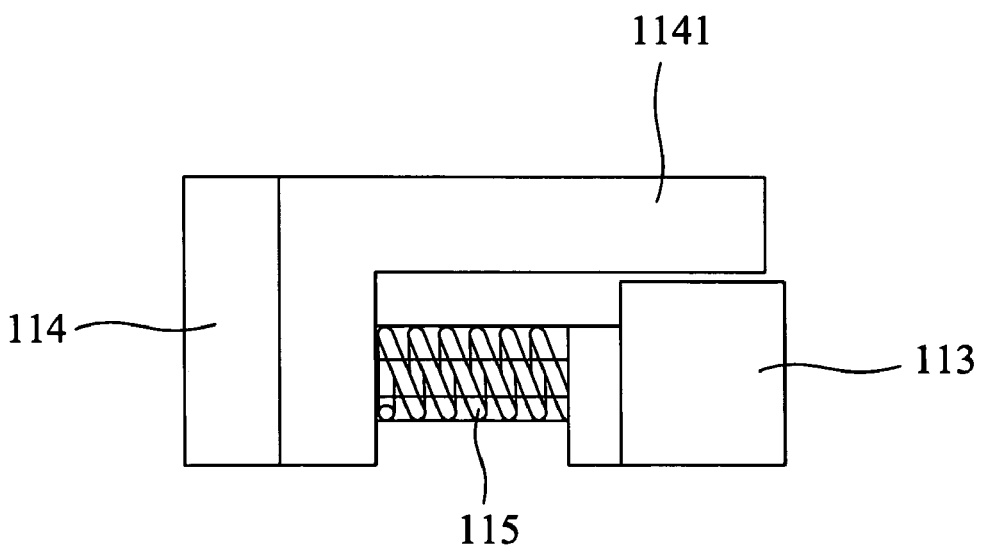
FIG. 4B is a schematic view of the conventional button in a compressed position.
Figure 5:
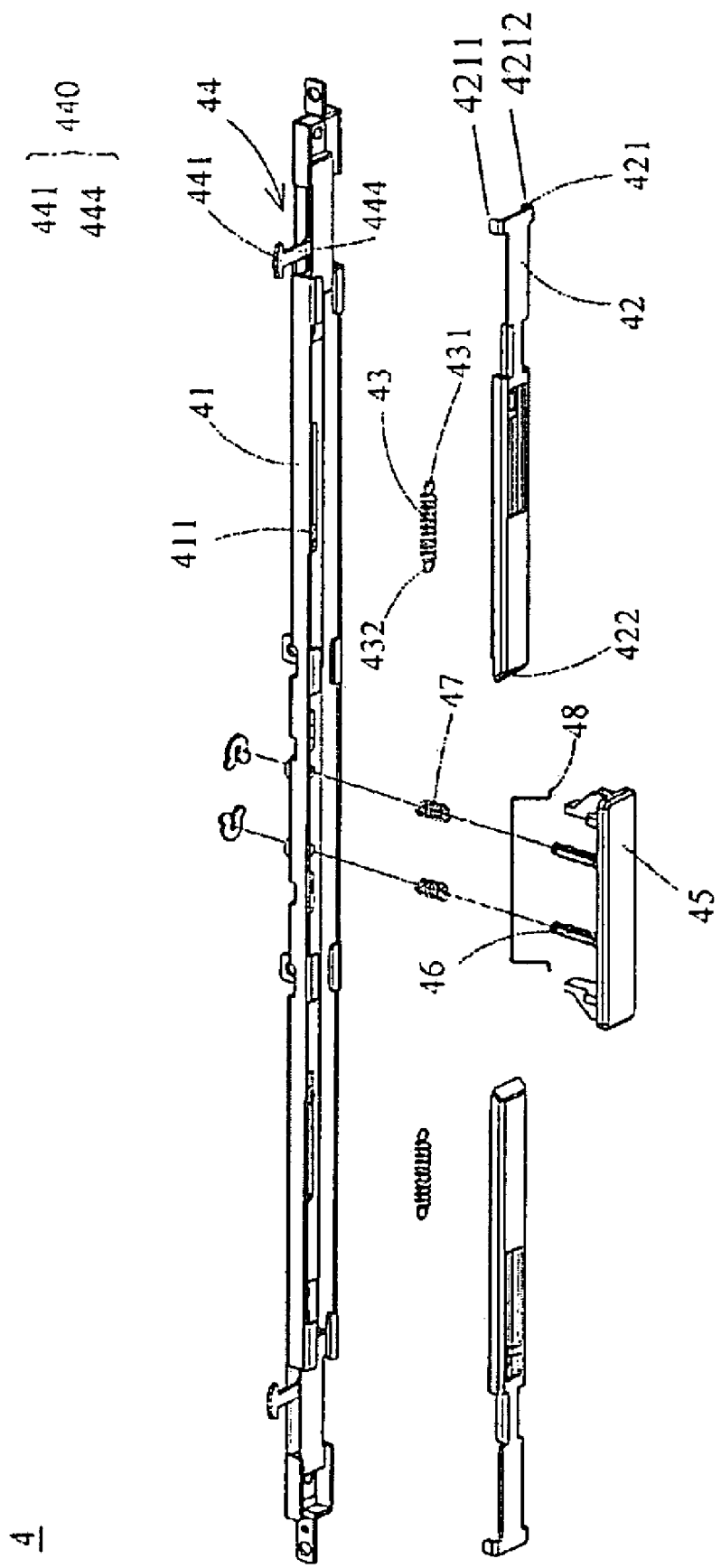
FIG. 5 is an explosive schematic view of a latch structure in an embodiment of the invention.

As shown in FIG. 5, the latch structure 4 according to an embodiment of the invention comprises a base 41, a connecting unit 42, a first spring member 43, at least one hook unit 44 and a button 45. In this embodiment, the base 41 may be an iron plate, at least one part of a case or may comprise plastic material. The connecting unit 42 has a first side 421 and a second side 422, and the connecting unit 42 is disposed on the base 41. The first side 421 has two protrusions/arms 4211 and 4212.

The first spring member 43 of the embodiment has a first end 431 and a second end 432. The first end 431 connects to the connecting unit 42 and the second end 432 connects to the base 41. The hook unit 44 is located at the first side 421 of the connecting unit 42, and the button 45 is located at the second side 422 of the connecting unit 42. And, the first side 421 is opposite to the second side 422.

Figure 6:
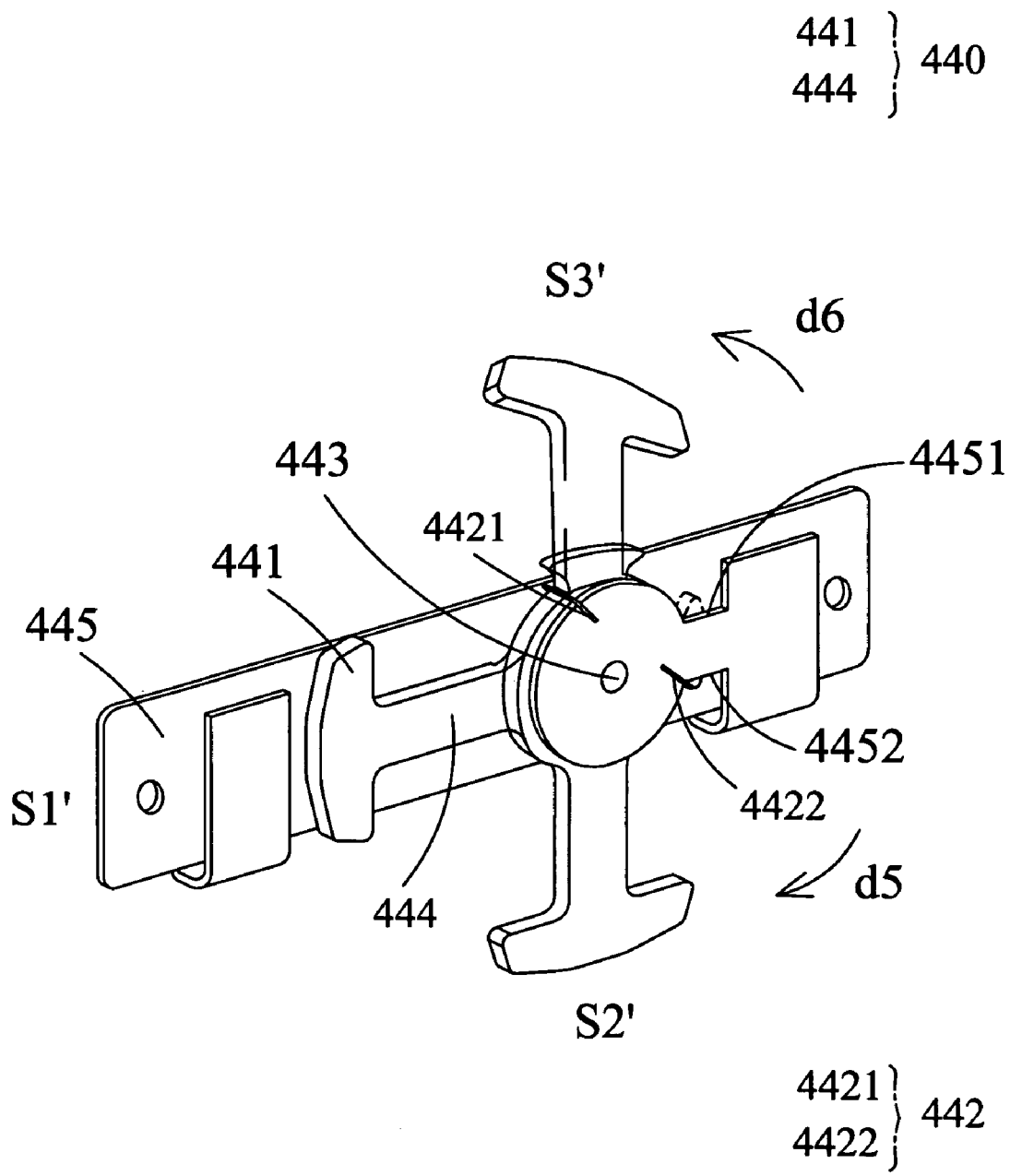
FIG. 6 is a schematic view that shows the movement of the hook unit in the embodiment of the invention.

As shown in FIG. 5 and FIG. 6, the hook unit 44 of the embodiment has a moving member 440 with a hook portion 441 and a connecting portion 442, and the hook portion 441 locates in a first site S1'. The connecting portion 442 connects to the hook portion 441.

As shown in FIG. 6, the hook unit 44 further comprises a fixing member 445, a second elastomer 442 and a shaft 443. The connecting portion 442 connects to the fixing member 445 in a pivot way, and the hook portion 441 and the connecting portion 442 are rotatable relatively for the fixing member 445. The fixing member 445 has a first stop portion 4451 and a second stop portion 4452. The second elastomer 442 further has a third end 4421 and a fourth end 4422. The third end 4421 presses on the first stop portion 4451 and is blocked from rotating in a fifth direction d5 (the fifth direction d5 is a clockwise direction in the embodiment), and the fourth end 4422 presses on the second stop portion 4452 and is blocked from rotating in a sixth direction d6 (the sixth direction d6 is a counterclockwise direction in the embodiment), wherein the fifth direction d5 is opposite to the sixth direction d6. The shaft 443 connects to the fixing member 445, and the second elastomer 442 disposes on the shaft 443. The moving member 440 pivots on the fixing member 445 through the shaft 443. The connecting portion 442 and the hook portion 441 are rotatable about the shaft 443.

As shown in FIG. 6, due to the resilience of the second spring member 442, the moving member 440 is in the first site S1'. However, when an external force, which is greater than the resilience of the second spring member 442 applies to the moving member 440, the moving member 440 may rotate between the first site S1', the second site S2' and the third site S3'. An included angle of the second site S2' and the third site S3' is 180 degree. And, the hook portion 441 may be T shaped and may comprise permeable materials.

Figure 7A:
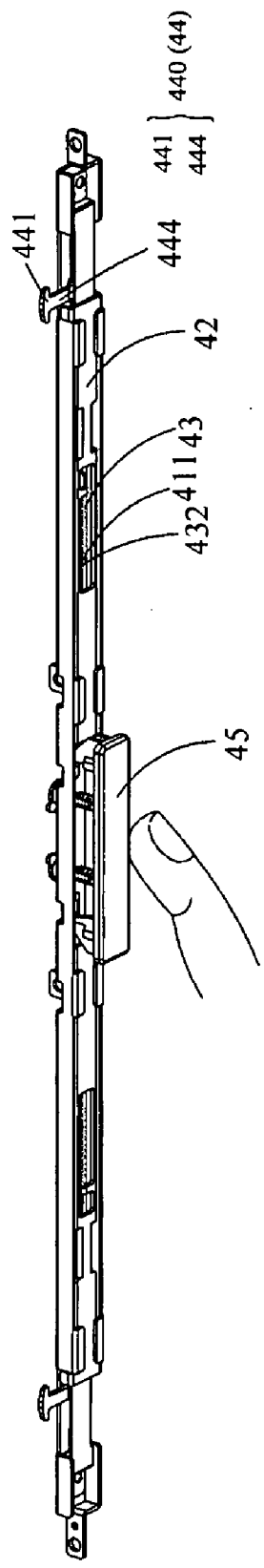
FIG. 7A to FIG. 7C are schematic views showing the movement of latch structure in the embodiment of the invention.
Figure 7B:
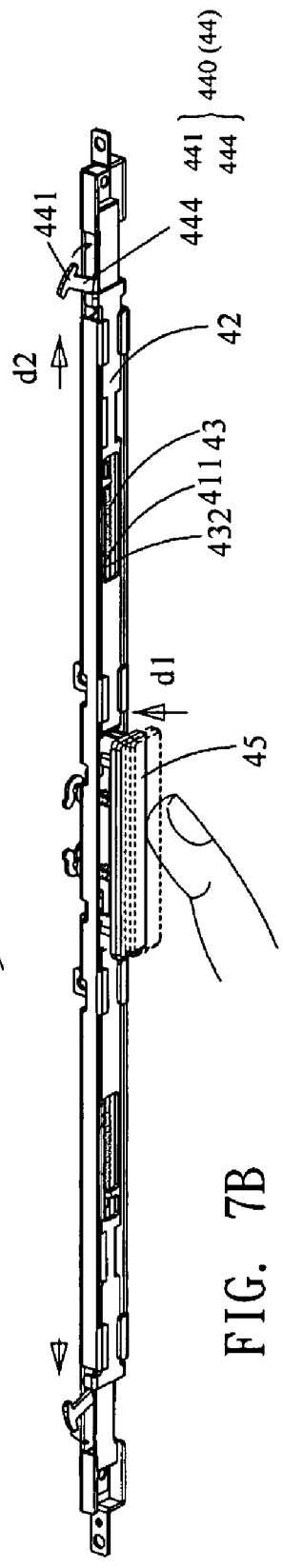
Figure 7C:
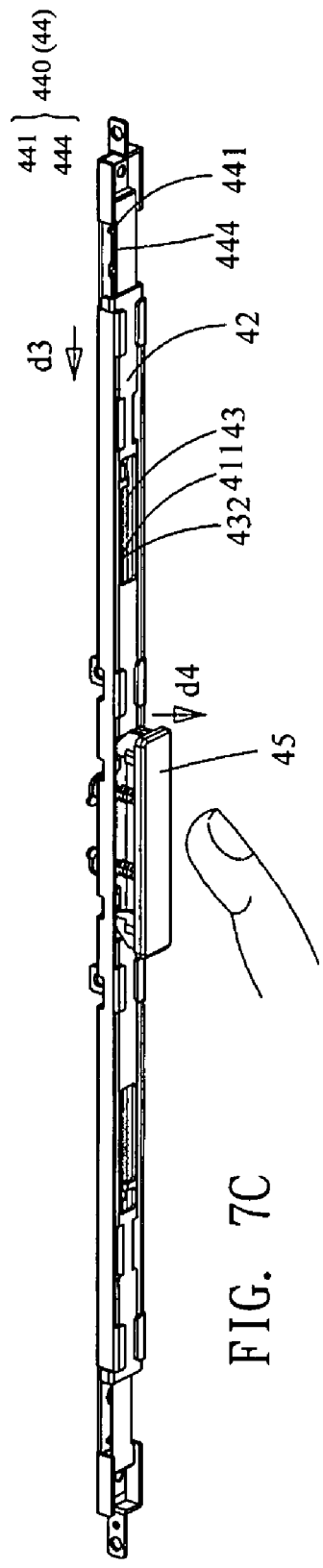

As shown in FIG. 7A to FIG. 7C, when the moving member 440 does not locate in the first site S1', the button 45 moves forward to a first direction d1, the button 45 pushes the connecting unit 42 in a second direction d2, and the connecting unit 42 touches the connecting portion 444, so that the hook portion 441 turns to the first site S1'.

Furthermore, as shown in FIG. 5 and FIG. 7A to FIG. 7C, the base 41 of the embodiment further comprises a third stop portion 411. The third stop portion 411 connects to the second end 432, wherein the second end 432 is blocked by the third stop portion 411 from moving in the second direction d2 when the button 45 pushes the connecting unit 42 in the second direction d2, so that the first spring member 43 provides a restoring force in a third direction d3. The connecting unit 42 moves in the third direction d3 according to the restoring force and pushes the button 45 in a fourth direction d4, wherein the third direction d3 is opposite to the second direction d2, and the fourth direction d4 is opposite to the first direction d1. Herein, the button 45 may touch another hook simultaneous, so that the hook can be received in a cover portion of the notebook. The movement mechanism of the hook is same as the above mentioned.

As shown in FIG. 5 again, the latch structure 4 further comprises at least one positioning member 46. The position member 46 disposes on the button 45 and passes through at least one corresponding hole of the base 41, so that the button 45 moves in the first direction d1 or the fourth direction d4.

The latch structure 4 further comprises at least one third spring member 47. The third spring member 47 disposes on the positioning member 46 and is between the button 45 and the base 41. When the button 45 is in a released position, the resilience of the third spring member 47 causes the button 45 moving the fourth direction d4 more easily. The latch structure 4 further comprises a limiting member 48. The limiting member 48 connects the button 45 and the base 41, so as to limit the movement of the button 45 in the fourth direction d4.

In this embodiment, the hook unit, the button, the connecting unit, the spring member and the base are adjacent to each other in the latch structure of the invention. The invention may shorten the fabricating time and increase the yield of the product.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A latch structure disposed in a first housing of an electronic device to latch a rotatable second housing to the first housing, the rotatable second housing being positioned between first and second positions with respect to the first housing, the latch structure comprising:

a base;

connecting units, each having a first side, a second side and two arms, each connecting unit disposed on the base, wherein the two arms are extended from the first side;

first spring members, each having a first end and a second end, the first end connecting to a respective connecting unit and the second end connecting to the base;

hook units, each being located at the first side of the respective connecting unit, each hook unit having a moving member with a hook portion and a connecting portion, the hook portion being rotated between first, second and third hook positions, each hook portion latching a structure of the rotatable second housing when each hook unit is at the second and third hook positions and unlatching the structure of the rotatable second housing when each hook portion is at the first hook position, each connecting portion and each connecting unit being substantially perpendicular to each other when the hook unit is in either second and third hook positions; and a button, located at the second sides of each connecting unit, wherein when the second housing is positioned in the second position with respect to the first housing, each hook portion is located in the second hook position, the button is moved forward in a first direction, the button will push each connecting unit in a second direction, and each pair of arms of the connecting units will touch the respective connecting portion of each hook unit, so that the hook portion turns to the first hook position to unlatch the latch structure, and wherein when second housing is positioned in the third position with respect to the first housing, each hook portion is located in the first hook position, the button is moved forward in the first direction, the button will push each connecting unit in the second direction, and each pair of arms of the connecting units will touch the respective connecting portion of each hook unit, so that the hook portion turns to the first hook position to unlatch the latch structure.

2. The latch structure of claim 1, wherein the hook unit further comprises:
   a fixing member, which has a first stop portion and a second stop portion, wherein the connecting portion connects to the fixing member in a pivotal way;
   a second spring member, which has a third end and a fourth end, the third end pressing on the first stop portion and being blocked from rotating in a fifth direction, and the fourth end pressing on the second stop portion and being blocked from rotating in a sixth direction, wherein the fifth direction is opposite to the sixth direction; and
   a shaft, which connects to the fixing member, the second spring member disposing on the shaft, the moving member pivoting on the fixing member through the shaft, and the connecting portion and the hook portion being rotatable about the shaft.

3. The latch structure of claim 1, wherein the hook portion is T shaped.

4. The latch structure of claim 1, wherein the base is an iron plate.

5. The latch structure of claim 1, wherein the base comprises plastic material.

6. The latch structure of claim 1, wherein the base is at least one part of the first housing.

7. The latch structure of claim 1, wherein:
   the base further comprises a stop portion connecting to the second end, wherein the second end is blocked by the stop portion from moving in the second direction when the button pushes the connecting unit in the second direction, so that the first spring member provides a restoring force in a third direction; and
   the connecting unit moves in the third direction according to the restoring force and pushes the button in a fourth direction, wherein the third direction is opposite to the second direction, and the fourth direction is opposite to the first direction.

8. The latch structure of claim 1, further comprising a limiting member connecting the button and the base.

9. The latch structure of claim 1, further comprising at least one positioning member disposed on the button and passing through at least one corresponding hole of the base, so that the button moving in the first direction or in the fourth direction.

10. The latch structure of claim 1, further comprising at least one more spring member disposed on the positioning member and being between the button and the base.

11. The latch structure of claim 1, wherein the button further comprising: two side-walls, which extended from two sides of the button, and when the button moves forward to a first direction, the one of two side-walls of the button pushes the connecting unit.

* * * * *